United States Patent
Yamashita

(10) Patent No.: US 6,975,305 B2
(45) Date of Patent: Dec. 13, 2005

(54) PRESSURE-SENSITIVE TOUCH PANEL

(75) Inventor: Shunichi Yamashita, Kanagawa (JP)

(73) Assignee: NEC Infrontia Corporation, (JP)

( * ) Notice: Subject to any disclaimer, the term of this patent is extended or adjusted under 35 U.S.C. 154(b) by 308 days.

(21) Appl. No.: 10/313,034

(22) Filed: Dec. 6, 2002

(65) Prior Publication Data
US 2003/0107556 A1 Jun. 12, 2003

(30) Foreign Application Priority Data
Dec. 7, 2001 (JP) .............................. 2001-374448

(51) Int. Cl.⁷ .......................... G09G 5/00; G08C 21/00
(52) U.S. Cl. .................. 345/173; 345/174; 178/18.01; 178/18.03; 178/18.05; 178/18.06
(58) Field of Search .. 345/173–180; 178/18.01–18.07, 178/19.01–19.06

(56) References Cited

U.S. PATENT DOCUMENTS

| | | | |
|---|---|---|---|
| 5,159,159 A * | 10/1992 | Asher ....................... | 178/18.05 |
| 6,078,274 A * | 6/2000 | Inou ............................ | 341/34 |
| 6,441,807 B1 * | 8/2002 | Yamaguchi .................. | 345/173 |
| 2002/0180712 A1 * | 12/2002 | Sato et al. ................... | 345/173 |

FOREIGN PATENT DOCUMENTS

| | | |
|---|---|---|
| JP | 58-101269 | 7/1983 |
| JP | 60-14383 | 1/1985 |
| JP | 64-27824 | 2/1989 |
| JP | 10-116147 | 5/1998 |
| JP | 11-291381 | 10/1999 |

* cited by examiner

Primary Examiner—Vijay Shankar
(74) Attorney, Agent, or Firm—Dickstein, Shapiro, Morin & Oshinsky, LLP.

(57) ABSTRACT

A pressure sensitive touch panel in which the position of an inner periphery of a window frame is disposed opposite to spacers, whereby a conductive film, which bends together with a flexible insulating plate when an operator presses the window frame, is caught by the spacers. In addition, protrusions are provided above the surface of an insulating layer, and inserted between the window frame and the flexible insulating plate or between the insulating layer and the conductive film, whereby the conductive film does not contact the upper edge of the end portion of the insulating layer. Thus, it is possible to avoid the damage to the conductive film due to the bending of the window frame and to avoid input of unintended and erroneous position data of input coordinates.

10 Claims, 4 Drawing Sheets

PRESSURE-SENSITIVE TOUCH PANEL

BACKGROUND OF THE INVENTION

1. Field of the Invention

The present invention relates to a pressure-sensitive touch panel and particularly, to a pressure-sensitive touch panel adopted to an input unit or the like of information equipment.

2. Description of the Prior Art

In a conventional pressure-sensitive touch panel, a flexible insulating plate in which first transparent conductive film is formed on an inner surface side and a glass plate in which second transparent conductive film is formed on an inner surface side in a similar manner are disposed oppositely so as to sandwich a predetermined gap.

In the pressure-sensitive touch panel, an operator partially contacts the first and second transparent conductive films by pressing the flexible insulating plate with a finger or a special pen. Then, position signals in a X axis direction and a Y axis direction of contacting positions of the first and second transparent conductive films are detected.

Incidentally, in the case of being built in a portable terminal, the pressure-sensitive touch panel is set under window frame of a cabinet and often used, normally, in a manner that the operator holds the window frame with fingers.

However, pressing force of the operator who inputs while holding the window frame bends the window frame and might cause unintended and erroneous position data of input coordinates.

SUMMARY OF THE INVENTION

Therefore, an object of the present invention is to provide a pressure-sensitive touch panel capable of preventing position data from being erroneously input, regardless of a pressing position by an operator. Another object of the present invention is to provide a pressure-sensitive touch panel capable of preventing the first transparent conductive film on the flexible insulating plate from damage.

According to a first aspect of the present invention, there is provided a pressure-sensitive touch panel comprising: a flexible insulating plate on which a first conductive film is formed; an insulating plate on which a second conductive film is formed, the second conductive film being oppositely disposed to the first conductive film; a pair of first conductors oppositely provided on opposing two sides of the first conductive film; a pair of second conductors oppositely provided on opposing two sides of the second conductive film in a direction orthogonal to the first conductors; an insulating layer for covering the second conductors; a plurality of spacers provided on the surface of the second conductive film; and a frame body disposed on the opposite surface to the first conductive film surface of the flexible insulating plate, the frame body regulating a touching area of the first conductive film; wherein an inner periphery end portion of the frame body is disposed oppositely to the spacers.

According to a second aspect of the present invention, there is provided a pressure-sensitive touch panel comprising: a flexible insulating plate on which a first conductive film is formed; an insulating plate on which a second conductive film is formed, the second conductive film being oppositely disposed to the first conductive film; a pair of first conductors oppositely provided on opposing two sides of the first conductive film; a pair of second conductors oppositely provided on opposing two sides of the second conductive film in a direction orthogonal to the first conductors; an insulating layer for covering the second conductors; a plurality of first spacers provided on the surface of the second conductive film; a frame body disposed on the opposite surface to the first conductive film surface of the flexible insulating plate, the frame body regulating touching area of the first conductive film; and a plurality of second spacers provided above the surface of the insulating layer, and inserted between the frame body and the flexible insulating plate or between the insulating layer and the first conductive film.

DETAILED DESCRIPTION OF THE PREFERRED EMBODIMENT

Hereinafter, one embodiment of a pressure-sensitive touch panel of the present invention will be described in detail with reference to the drawings.

Figure 1:
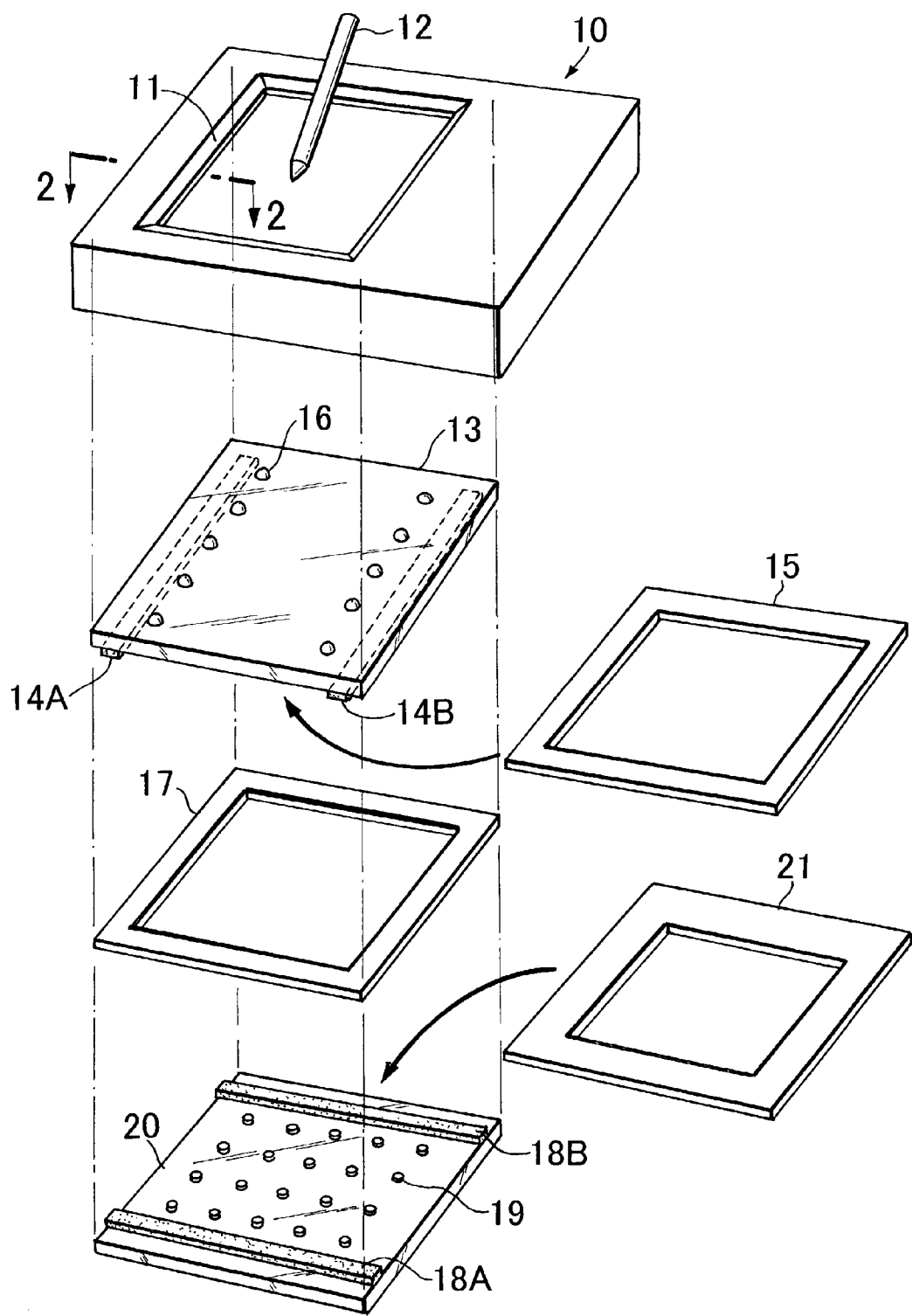
FIG. 1 is an exploded view showing the structure of a first embodiment of the pressure-sensitive touch panel of the present invention.
Figure 2:
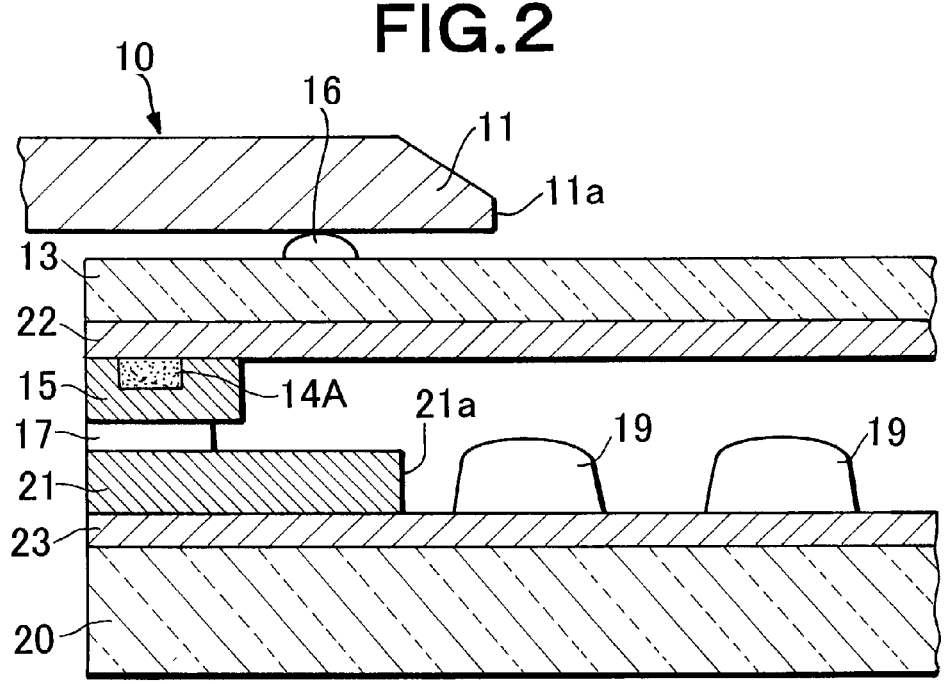
FIG. 2 is a longitudinal sectional view in correspondence with 2—2 section in FIG. 1.

FIG. 1 is an exploded view showing the structure of a first embodiment of the pressure-sensitive touch panel of the present invention, and FIG. 2 is a longitudinal sectional view in correspondence with 2—2 section in FIG. 1. FIG. 2 shows the thickness of a component in an exaggerated form, as compared to directions of the width and length thereof. In FIG. 1, transparent conductive films 22 and 23 are omitted.

Figure 3:
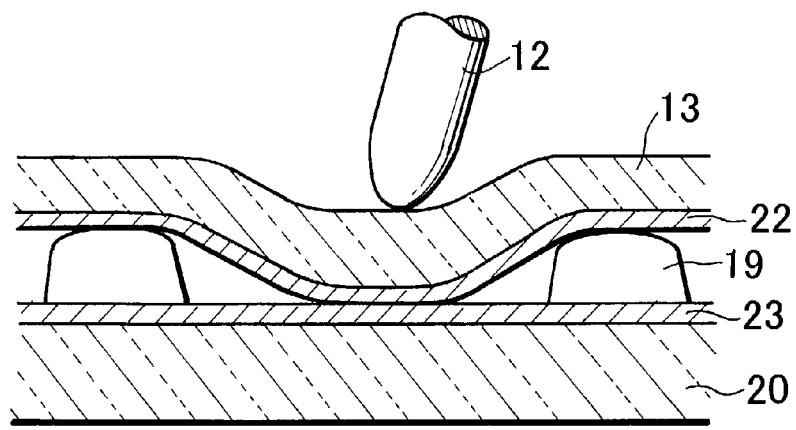
FIG. 3 is a longitudinal sectional view in case of pressing a flexible insulating plate with a special pen.

FIG. 3 is a longitudinal sectional view in case of pressing the flexible insulating plate with a special pen.

For the inside of cabinet 10 of a pressure-sensitive touch panel, flexible insulating plate 13 in which transparent conductive film 22 is formed on an inner surface side and glass plate (as an insulating plate) 20 in which transparent conductive film 23 is formed on an inner surface side in a similar manner are disposed oppositely so as to sandwich a predetermined gap.

The conductive film 22 is provided with conductors 14A and 14B disposed along opposite two sides of the transparent conductive film 22 on the flexible insulating plate 13 as shown in FIG. 1, and each of the conductors 14A and 14B is fixed to the flexible insulating plate 13 via the transparent conductive film 22. Each of the conductors 14A and 14B is covered with insulating layer 15. The insulating layer 15 may be not formed on each of the conductors 14A and 14B.

On the other hand, the transparent conductive film 23 is provided with conductors 18A and 18B disposed along opposite two sides of the transparent conductive film 23 on the glass plate 20 in a direction orthogonal to the conductors 14A and 14B. Each of the conductors 18A and 18B is fixed to the glass plate 20 via the transparent conductive film 23 and covered with insulating layer 21. Spacers 19 in an almost truncated cone shape are bound onto the inner surface side of the transparent conductive film 23 at predetermined intervals. The width of the insulating layer 21 is wider than the width of the insulating layer 15.

Furthermore, double-faced tape 17 as a connecting member is inserted between the insulating layers 15 and 21, and the flexible insulating plate 13 and the glass plate 20 are fixed to each other by the double-faced tape 17, and a predetermined gap is kept between the transparent conductive films 22 and 23 by the spacers 19, and thus the pressure-sensitive touch panel is constituted.

In the pressure-sensitive touch panel constituted in this manner, an operator partially contacts the transparent conductive films 22 and 23 by pressing the flexible insulating plate 13 with special pen 12 or a finger. Then, position signals in an X axis direction and a Y axis direction of contacting positions of the conductive films 22 and 23 are sent to the input unit of information equipment or the like via the conductors 14A, 14B, 18A and 18B.

The inner end surface 11a of window frame 11 in the cabinet 10 projects more inward than the position of the inner end surface 21a of the insulating layer 21, and further reaches to an almost central position of spacers 19 adjacent to the insulating layer 21.

Therefore, even when the window frame 11 bended by press force of an operator presses the flexible insulating plate 13, or the special pen 12 presses or slides over the flexible insulating plate 13 near to the inner end surface 11a of window frame 11, the transparent conductive film 22 on the flexible insulating plate 13 contacts firstly to the spacers 19, so that the contact between the transparent conductive films 22 and 23 is prevented, thereby making it possible to avoid input of unintended and erroneous position data of input coordinates. In addition, the transparent conductive film 22 does not contact with an upper edge of the inner end portion of the insulating layer 21, thereby making it possible to avoid the damage to the conductive film 22.

On the other hand, semi-spherical protrusions (as second spacers) 16 are disposed at predetermined intervals and bound along the conductors 14A and 14B (that is, along two sides of the flexible insulating plate 13) onto an outer surface of the flexible insulating plate 13, and further, the position of the protrusions 16 are in a central part between an inner periphery of the insulating layer 15 and an inner periphery of the insulating layer 21. The protrusions 16 may be disposed along four sides (an outer periphery) of the flexible insulating plate 13 onto an outer surface of the flexible insulating plate 13. In case of pressing only one side of the window frame 11, the protrusions 16 may be disposed along the conductor (for example, the conductor 14B) of the pressing side of the window frame 11.

In the pressure-sensitive touch panel constituted in this manner, even when an operator presses the window frame 11, the flexible insulating plate 13 bends firstly at a fixing part of the protrusions 16, and the transparent conductive film 22 on the reverse side contacts the upper surface (the inner surface) of the insulating layer 21, so that the contact between the transparent conductive films 22 and 23 is prevented, thereby making it possible to avoid input of unintended and erroneous position data of input coordinates. In addition, the transparent conductive film 22 does not contact with an upper edge of the inner end portion of the insulating layer 21 at the angle that make damage, thereby making it possible to avoid the damage to the transparent conductive film 22.

Either the structure that the inner end portion of window frame 11 reaches to an almost central position of spacer 19 or the structure that protrusions 16 are disposed at predetermined intervals onto an outer surface of the flexible insulating plate 13 may be adopted in present embodiment.

In the embodiment described above, although an example of the protrusions 16 provided on the flexible insulating plate 13 has been described, the protrusions 16 may be provided on the side of the window frame 11 in an opposite direction. Although semi-spherical protrusions as spacers are used, a line shape spacer that sectional shape is semicircle or the like may be used as spacer. Two or more such line shape spacers may be disposed in line shape.

Next, a second embodiment of the pressure-sensitive touch panel of the present invention will be described with a longitudinal sectional view of FIG. 4.

Figure 4:
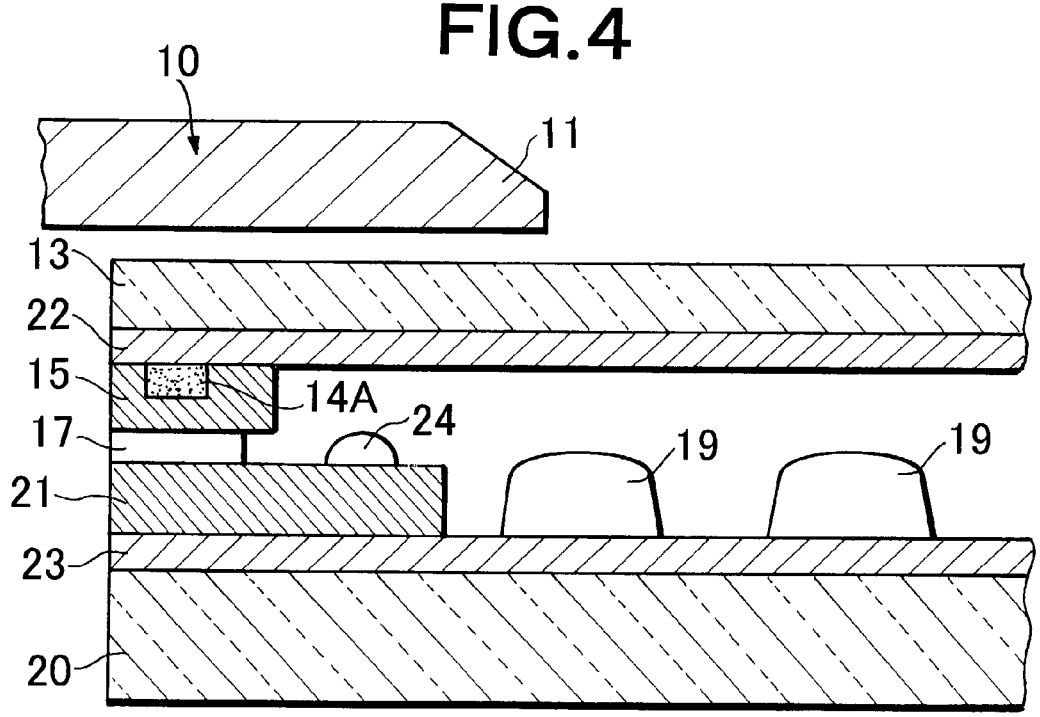
FIG. 4 is a longitudinal sectional view showing the structure of second embodiment of the pressure-sensitive touch panel of the present invention.

In FIG. 4, the difference from the structure of FIGS. 1 and 2 shown in the first embodiment is in that the position of the protrusion is changed, and the others are the same as those in FIGS. 1 and 2.

In other words, protrusion (as second spacers) 24 is provided on an inner surface side of the insulating layer 21 at an intermediate position between the inner periphery of the insulating layer 21 and the inner periphery of the insulating layer 15 at predetermined intervals.

Also in the pressure-sensitive touch panel constituted in this manner, when the window frame 11 bended by press force of an operator presses the flexible insulating plate 13, or the special pen 12 presses or slides over the flexible insulating plate 13 near to the inner end surface 11a of window frame 11, the transparent conductive film 22, which bends together with the flexible insulating plate 13, first contacts the protrusions 24 so that the contact with the upper edge of the inner periphery of the insulating layer 21 can be prevented, thereby making it possible to avoid the damage to the transparent conductive film 22 due to the bending of the window frame 11 and to avoid input of unintended and erroneous position data of input coordinates.

In this embodiment, although an example of the protrusions 24 provided on the insulating layer 21 has been described, the protrusions 24 may be provided on the side of the transparent conductive film 22 in an opposite direction. In this embodiment, the insulating plates 13, 20 and the conductive films 22, 23 are transparent, but may be semitransparent or opaque.

Figure 5:
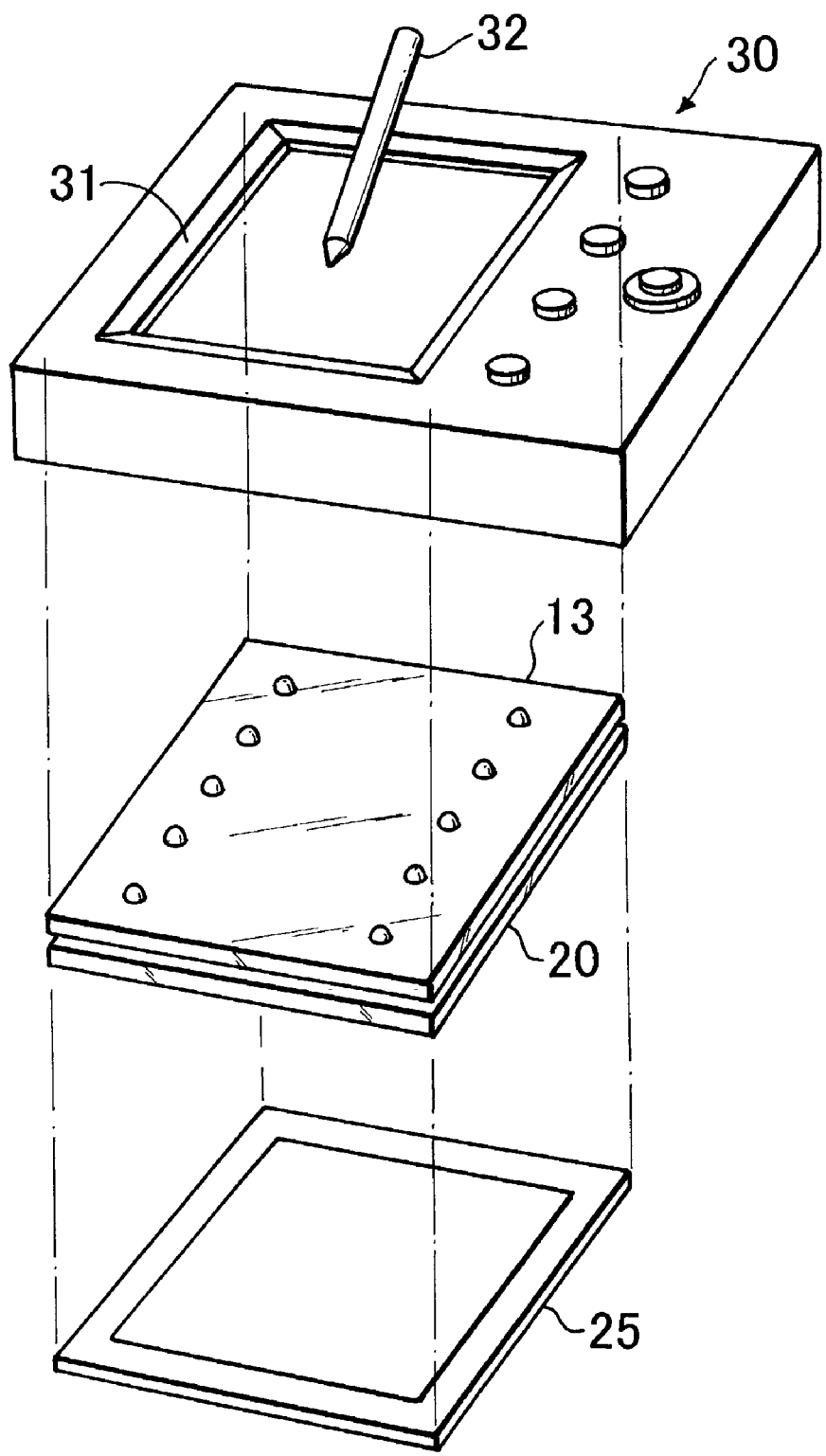
FIG. 5 is an exploded view showing the structure of portable information equipment containing the above pressure-sensitive touch panel.

FIG. 5 is an exploded view showing the structure of portable information equipment containing the above pressure-sensitive touch panel.

The pressure-sensitive touch panel is disposed on a flat display panel such as a liquid crystal display panel or an electro-luminescence display panel. The pressure-sensitive touch panel and flat display panel are disposed under window frame 31 of cabinet 30 of portable information equipment. Selecting operation for selecting icons or the like on the flat display panel or handwriting input operation for inputting a letter, a character or a figure into the flat display panel is performed by pressing or sliding over the flexible insulating plate 13 of the pressure-sensitive touch panel with special pen 32 or a finger.

The pressure-sensitive touch panel of the above-described present embodiment is used as input terminal for inputting image information or the like into a computer. The combination device of the pressure-sensitive touch panel and the flat display is used as the information inputting portion of information equipment, such as the monitor of a desktop type personal computer, the display portion of a note type personal computer or a tablet type personal computer, the display portion of a cash register or an automated teller machine.

What is claimed is:

1. A pressure-sensitive touch panel comprising:
a flexible insulating plate on which a first conductive film is formed;
an insulating plate on which a second conductive film is formed, said second conductive film being oppositely disposed to said first conductive film;
a pair of first conductors oppositely provided on opposing two sides of said first conductive film;
a pair of second conductors oppositely provided on opposing two sides of said second conductive film in a direction orthogonal to said first conductors;
an insulating layer for covering said second conductors;
a plurality of spacers provided on the surface of said second conductive film; and
a frame body disposed on the opposite surface to the first conductive film surface of said flexible insulating plate, said frame body regulating a touching area of said first conductive film;
wherein an inner periphery end portion of said frame body is disposed oppositely to and directly above a subset of the plurality of said spacers.

2. A pressure-sensitive touch panel comprising:
a flexible insulating plate on which a first conductive film is formed;
an insulating plate on which a second conductive film is formed, said second conductive film being oppositely disposed to said first conductive film;
a pair of first conductors oppositely provided on opposing two sides of said first conductive film;
a pair of second conductors oppositely provided on opposing two sides of said second conductive film in a direction orthogonal to said first conductors;
an insulating layer for covering said second conductors;
a plurality of first spacers provided on the surface of said second conductive film; a frame body disposed on the opposite surface to the first conductive film surface of said flexible insulating plate, said frame body regulating touching area of said first conductive film; and
a plurality of second spacers provided above the surface of said insulating layer, and inserted between said frame body and said flexible insulating plate or between said insulating layer and said first conductive film.

3. The pressure-sensitive touch panel as claimed in claim 2, wherein an inner periphery end portion of said frame body is disposed opposite to said first spacers.

4. The pressure-sensitive touch panel as claimed in claim 2, further comprising an insulating layer for covering said first conductors.

5. The pressure-sensitive touch panel as claimed in claim 4, wherein the position of said second spacers is in a central part between an end portion of said insulating layer for covering said first conductors and an end portion of said insulating layer for covering said second conductors.

6. The pressure-sensitive touch panel as claimed in claim 4, wherein said second spacers are fixed on said flexible insulating plate or said insulating layer for covering said second conductors.

7. Information equipment containing an information-inputting portion which comprises the pressure-sensitive touch panel as claimed in claim 1 and a flat display panel disposed on said pressure-sensitive touch panel.

8. Information equipment containing an information inputting portion which comprises the pressure-sensitive touch panel as claimed in claim 2 and a flat display panel disposed on said pressure-sensitive touch panel.

9. The pressure-sensitive touch panel of claim 1, wherein the plurality of spacers have a frustoconical shape.

10. The pressure-sensitive touch panel of claim 9, wherein each of the plurality of spacers is a solid body comprising:
a base surface that is attached to the surface of said second conductive film;
a top surface that is substantially in parallel with the base surface and has a smaller area than the base surface; and
a side surface that connects the base surface and the top surface, wherein a junction between the side surface and the top surface does not form a sharp edge.

* * * * *